United States Patent
Petkov et al.

(10) Patent No.: US 10,354,451 B2
(45) Date of Patent: Jul. 16, 2019

(54) EXPLORATION OF MEDICAL VISUALIZATION PARAMETERS IN VIRTUAL SPACES

(71) Applicant: Siemens Healthcare GmbH, Erlangen (DE)

(72) Inventors: Kaloian Petkov, Lawrenceville, NJ (US); Christoph Vetter, Hopewell, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 15/825,137

(22) Filed: Nov. 29, 2017

(65) Prior Publication Data

US 2019/0164345 A1    May 30, 2019

(51) Int. Cl.
*G06T 19/00* (2011.01)
*G06F 3/0481* (2013.01)
*G06T 15/08* (2011.01)

(52) U.S. Cl.
CPC ........ *G06T 19/006* (2013.01); *G06F 3/04815* (2013.01); *G06T 15/08* (2013.01); *G06T 2210/41* (2013.01)

(58) Field of Classification Search
None
See application file for complete search history.

(56) References Cited

U.S. PATENT DOCUMENTS

| | | | | |
|---|---|---|---|---|
| 8,237,714 | B1* | 8/2012 | Burke | G06F 17/30572 345/440 |
| 2008/0030819 | A1* | 2/2008 | Klug | G03H 1/22 359/23 |
| 2009/0094225 | A1* | 4/2009 | Cradick | G06F 17/30864 |
| 2016/0188997 | A1* | 6/2016 | Desnoyer | G06T 7/55 382/190 |
| 2016/0363767 | A1 | 12/2016 | Osborn et al. | |
| 2017/0358096 | A1* | 12/2017 | Boss | H04N 9/31 |
| 2018/0276900 | A1* | 9/2018 | Kinstner | G06T 19/20 |

OTHER PUBLICATIONS

Johnson, William R., et al. "Snapshot hyperspectral imaging in ophthalmology." Journal of biomedical optics 12.1 (2007): 014036 (Year: 2007).*

Nehmetallah, Georges, and Partha P. Banerjee. "Applications of digital and analog holography in three-dimensional imaging." Advances in Optics in Photonics 4.4 (2012): 472-553 (Year: 2012).*

(Continued)

*Primary Examiner* — Diane M Wills

(57) ABSTRACT

A computer-implemented method for exploration of medical visualization parameters in virtual spaces includes detecting a user location and a user orientation in a physical space and generating a display of an immersive layout centered at the user location and the user orientation. A plurality of holograms is generated within in the immersive layout. Each hologram depicts a rendering of a medical image with a distinct combination of rendering parameter values. The display is updated based on a change to one or more of the user location and the user orientation in the physical space.

19 Claims, 7 Drawing Sheets

(56) References Cited

OTHER PUBLICATIONS

Pinto et al., "Two-Level Interaction Transfer Function Design Combining Boundary Emphasis, Manual Specification and Evolutive Generation", DOI: 10.1109/SIBGRAPH, 2006 (Year: 2006).*
K. Petkov, et al., "Visual exploration of the infinite canvas," 2013 IEEE Virtual Reality (VR), 2013, pp. 11-14.
K. Petkov, et al. "Point Cloud Proxy for Physically-based Volume Rendering," Siemens Medical Solutions, Invention Disclosure, 2016.
K. Petkov, et al."Hyper-Realistic Rendered 3D-Printable Surface Models." Siemens Medical Solutions, Invention Disclosure, 2017.
M. Levoy, Et al., Light Field Rendering, Proc. SIGGRAPH '96, ACM, 1996, pp. 31-42.
Gortler et al., Grzeszczuk, Szeliski, Cohen, The Lumigraph, Proc. SIGGRAPH '96, ACM, 1996, pp. 43-54.
Extended European Search Report (EESR) dated Mar. 28, 2019 in corresponding European Patent Application No. 18208521.7.
Fedorov, Andriy, et al. "3D Slicer as an image computing platform for the Quantitative Imaging Network." Magnetic resonance imaging 30.9 (2012): 1323-1341.

* cited by examiner

EXPLORATION OF MEDICAL VISUALIZATION PARAMETERS IN VIRTUAL SPACES

TECHNOLOGY FIELD

The present invention relates generally to methods, systems, and apparatuses for exploring medical visualization parameters in virtual spaces. The technology described herein may be applied, for example, to visualize rendering parameters in an immersive layout using technologies such as augmented reality.

BACKGROUND

Medical images are rendered using algorithms and other processes that depend on a large number of parameters. It is often difficult, even for the most experienced user, to understand how each parameter affects the rendering and, ultimately, the visualization of the underlying medical image data. As a result, there is a need to navigate the parameter space in a meaningful and efficient manner to identify the best set of parameter values for a desired visualization.

The challenges of exploring the large parameter spaces of the rendering parameters are often addressed by well-designed traditional user interfaces and, more recently, machine learning approaches that simplify the parameter specification. Collections of parameters may be grouped into presets and presented to the user via reference images or category descriptions. Some conventional systems present presets for sub-groups of parameters to the user, allowing for a guided approach to the parameter selection. However, each of these approaches only allows for limited interaction with the user. Thus, it is desired to provide a more immersive interface for exploring the parameter space that allows for greater user interaction and targeting of sub-groups of parameters.

SUMMARY

Embodiments of the present invention address and overcome one or more of the above shortcomings and drawbacks, by providing methods, systems, and apparatuses related to exploring medical visualization parameters in virtual spaces. In short, techniques such as Augmented Reality (AR) and Virtual Reality (VR) are utilized to explore the parameter space using an immersive layout centered at the user location and the user orientation. Different parameter sets may be selected, for example, using natural gestures, physical/virtual tools, and more traditional 2D interfaces mapped to the 3D environment.

According to some embodiments, a computer-implemented method for exploration of medical visualization parameters in virtual spaces includes detecting a user location and a user orientation in a physical space and generating a display of an immersive layout centered at the user location and the user orientation. Holograms are generated within in the immersive layout. Each hologram depicts a rendering of a medical image with a distinct combination of rendering parameter values. Each hologram may be generated, for example, using a pre-rendered point cloud-based proxy, a mesh-based proxy, or a light field located in the immersive layout. In some embodiments, each hologram provides a photorealistic rendering of the medical image generated using one or more Monte Carlo ray tracing techniques. The aforementioned display may be updated based on a change to one or more of the user location and the user orientation in the physical space.

According to another aspect of the present invention, in some embodiments, a computer-implemented method for exploration of medical visualization parameters in virtual spaces includes receiving a selection of a parameter space comprising all possible combinations of values for image rending system parameters and identifying distinct combination of values in the parameter space. Positional coordinates are determined in a multi-dimensional virtual space for each distinct combination of values in the parameter space based on a mapping of the parameter space to the multi-dimensional virtual space. A hologram is generated for each distinct combination of values providing a rendering of a medical image with the distinct combination of values. Each hologram is displayed in an immersive layout within the multi-dimensional virtual space. The immersive layout is centered on a location corresponding to a user. Each hologram is displayed at the positional coordinates corresponding to the distinct combination of values used to generate the hologram.

According to other embodiments, a computer-implemented method for exploration of medical visualization parameters in virtual spaces includes receiving a selection of a parameter space comprising all possible combinations of values for image rending system parameters and identifying distinct combination of values in the parameter space. Holograms corresponding to the distinct combination of values are generated. Each hologram is a rendering of a medical image with one of the distinct combination of values. Clusters of holograms are created. Each cluster comprises visually similar holograms from the holograms. The clusters of holograms are displayed in an immersive layout within a multi-dimensional virtual space. The positioning of the immersive layout is based at least in part of a user location.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the cardiac motion assessment technique, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The following disclosure describes the present invention according to several embodiments directed at methods, systems, and apparatuses related to the exploration of medical visualization parameters in virtual spaces. In some embodiments, the parameter space is explored using holograms. Each hologram is a single 3D rendering of the medical data, placed in the virtual 3D environment around the user and viewed from the outside. The techniques described herein utilize a user interaction system for a variety of data exploration scenarios, including intuitive navigation of 3D space and transfer function design. The parameter exploration is achieved by generating holograms that vary specific subsets of the rendering system parameters. An immersive layout is then used to present the holograms to user in a way that optimizes the parameter exploration.

The systems and methods described herein support the interactive exploration of various types of rendering parameters. For example, the most common manipulation of look up tables for volume rendering is windowing, which is used to select sub-ranges from the data for visualization. Using the techniques described herein, variations of the window width and window center can be presented in 2D layouts, or the parameters can be explored individually on 1D layouts. The mapping of data properties to visualization properties can be varied by the system 100 to generate hologram galleries. For example, in one embodiment, a set of preset transfer functions can be mapped to a 1D layout. Similarly high-dimensional transfer functions can be mapped to 2D or 3D hologram layouts. Lighting direction and intensity, materials properties, etc. can be varied to generate hologram galleries in various layouts. Additionally, the holograms displayed to a user can be static or rotating, with the user optionally moving in physical space in order to visualize different data orientations.

Figure 1:
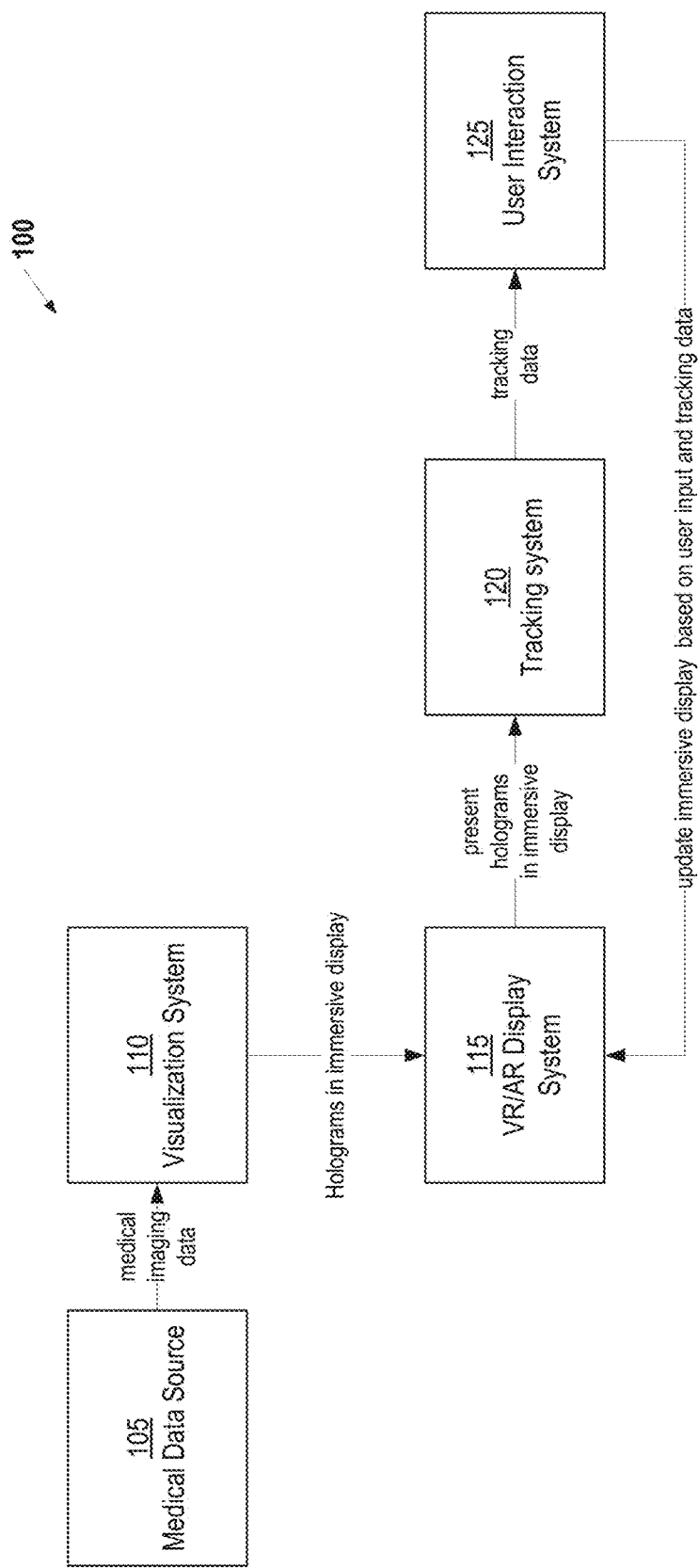
FIG. 1 illustrates a system for exploring medical visualization parameters, according to some embodiments.

FIG. 1 illustrates a system 100 for exploring medical visualization parameters, according to some embodiments. Medical data source 105 provides medical imaging data in any format known in the art. In general, the medical data source 105 may be any source of 3D/4D Digital Imaging and Communications in Medicine (DICOM) data including, without limitation, picture archiving and communication system (PACS) or raw data. The data may originate from various scanning modalities including, without limitation, ultrasound, computed tomography, and magnetic resonance. In some embodiments, the medical data source 105 is an imaging scanner (e.g., computed tomography scanner) that provides real-time or near real-time access to medical imaging data as it is acquired. In other embodiments, the medical data source 105 is a database that stores previously acquired medical image data.

Visualization system 110 is a 3D volume rendering system. In general, any 3D volume rendering system known in the art may be used. In some embodiments, the visualization system 110 supports stereoscopic cameras and sufficient performance for producing holograms in VR/AR. The VR/AR display system 115 is any display system that can support an AR/VR experience including, but not limited to, immersive displays (e.g., 5-sided CAVE, display walls), AR headsets, VR headsets, volumetric displays, stereoscopic displays, projected displays. Some display systems, and especially non-AR displays, may only support a subset of the interaction techniques.

In some embodiments, holograms are non-realistic representations of the data using Information Visualization (InfoVis) techniques such as quantitative measurements, graphs, charts, etc. In other embodiments, photorealistic rendering is used to generate the holograms. Monte Carlo ray tracing is a useful rendering technique for light transport computations, where the natural light phenomena are modeled using a stochastic process. When applied to volume rendering, the technique can produce a number of global illumination effects over the traditional Direct Volume Rendering (DVR). Such effects include ambient light occlusion, soft shadows, color bleeding and depth of field, all of which increase the realism of the produced images and improve user performance on perceptually-based tasks. At the same time, evaluation of the rendering integral may require thousands of stochastic samples per pixel to produce an acceptably noise-free image. Depending on the rendering parameters, this could be on the order of seconds for interactive workflows and multiple hours for production-quality images. This algorithm allows the rendering of holograms with cinematic qualities and may be used during interaction at reduced quality or for pre-rendering hologram proxies at higher quality.

In some embodiments, the holograms can be generated by the Visualization system 110 interactively in real-time and in response to user interaction (as described in further detail below). Specifically, the renderer would need to interactively regenerate the view as the user moves in physical space. User interaction may trigger additional rendering actions too. In another embodiment, holograms are generated from pre-rendered point cloud-based proxies, mesh-based proxies, light fields or other caching techniques. The renderer for the cached data can implement fast raycasting or more complex physically-based light transport techniques (e.g., Siemens Cinematic Renderer™).

The visualization system 110 may present the holograms in a variety of different immersive layouts. Such can be categorized by size, including large-scale immersive galleries and local small-scale selection galleries that are dynamically generated near the user's hands. Hologram layouts may be anchored to the user, e.g. small spherical selection layout may be anchored to the user's left hand, while selection is performed with the right hand.

The layouts generated by the visualization system 110 can provide non-linear representations of the parameter spaces. For example, clustering is used to replace visually similar holograms with a representative hologram. Such clustering may be based on the Perceptual Hash or any other similarity metric. In one embodiment, the size of the hologram may represent the cluster size or other cluster properties. In another embodiment, the layout is adjusted based on the cluster size (e.g., moving nearby holograms farther away from large clusters). Clusters can be interactively expanded into a local secondary layout (e.g., spherical shell layout around the cluster center) or collapsed.

Hierarchical layouts may be used for guided exploration, e.g. start with an M×N grid of holograms, selected hologram is expanded onto a secondary layout on a layer in front of the original grid. Hologram rendering parameters may be affected by cluster or hierarchical positioning; for example, the hologram opacity for the spherical expanded layout may be based on the similarity to the cluster center hologram. On AR systems, holograms may be anchored to physical objects near the user (e.g. generating 2D grids of holograms onto physical walls or tables).

In some embodiments, the holograms can be arranged in a circular fashion so that the user can turn in order to look at for example different windowing width. The system 100 is not restricted by laws of physics, a 360° rotation does not have to end up at the original set of parameters, instead the change in the parameter can continue with each consecutive turn. This embodiment extends the concept of the Infinite Canvas with interactive hologram galleries in AR/VR.

In some embodiments, visualization system 110 may be configured to present internal views of the data. For example, in the specific case of colonoscopy data, the immersive view would place the user virtually inside the tubular structure of the colon (a non-holographic view), while the small-scale local layouts may present the nearby colon surfaces from an outside view with varying render parameters. In this case, the small-scale holograms may be updated interactively as the user explores the large-scale image.

Continuing with reference to FIG. 1, tracking system 120 tracks at least one user in a physical space monitoring, for example, the user's location, orientation, head position, and hand position. Multi-user tracking, eye-tracking, finger-tracking, full-body tracking can be utilized as well. In some embodiments, the system 100 is partially integrated into an AR/VR headset and provide data fusion with external trackers, including magnetic, optical, inertial and hybrid trackers. Finally, user interaction system 125 implements hologram interaction based on user input and tracking data. Various hologram interactions may be implemented with natural physical gestures. For example, in some embodiments, the user interaction system 125 supports selection by grabbing and moving a hologram from its original layout. A secondary layout may be automatically generated for clustered or hierarchical layouts. The entire history of the exploration is visible to the user in the surrounding virtual space, leveraging the human spatial memory to navigate branches in that history. In other embodiments, "tossing away" of holograms (e.g., with toss motion to the left or right) may be used to go back in the guided exploration case. Traditional interaction tools may be used in place of physical movement in AR/VR (e.g. using a trackball interface) in some embodiments.

In some embodiments, multiple parameters are explored one at a time, where selecting a hologram is used to fix a parameter selection and a collection of holograms are generated for a new parameter using a secondary layout. Examples for the secondary layout include a grid at a different depth from the original grid and local unordered spherical layout. If only 2 parameters are investigated in each step while exploring a high-dimensional function, a series of secondary layouts can be used to visualize the path that the user took in arriving at particular function parameters. This also enables easy and intuitive backtracking.

Figure 2A:
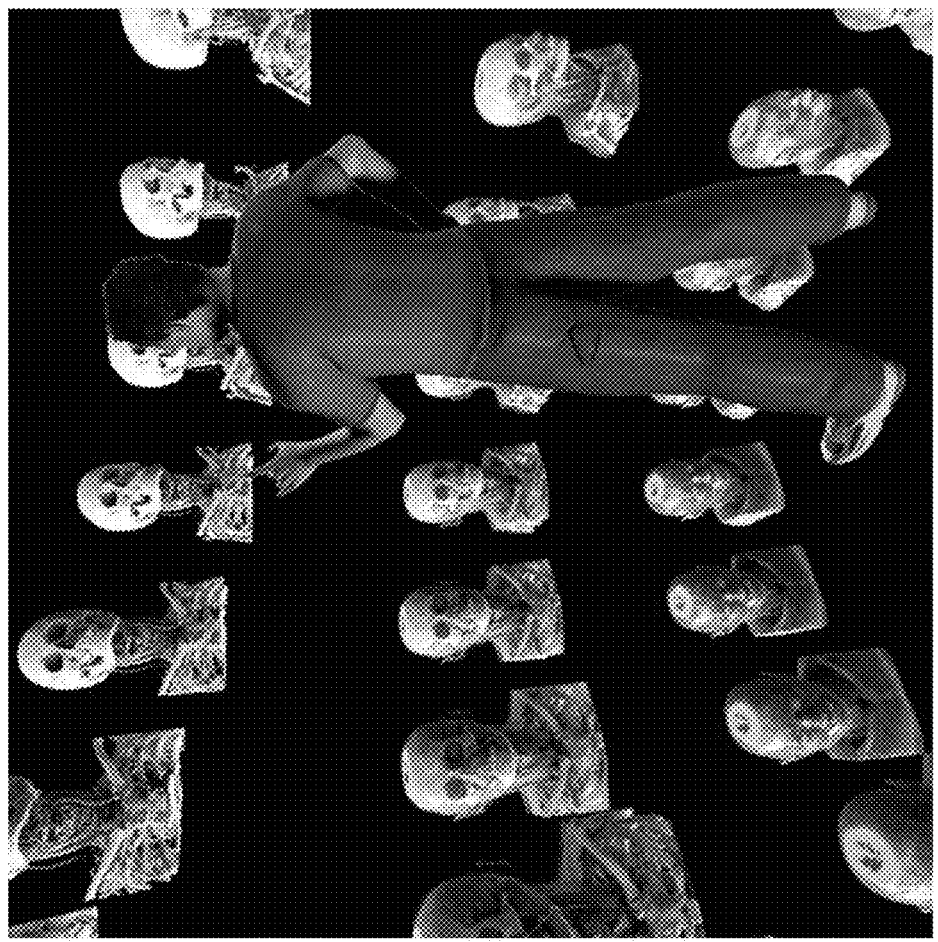
FIG. 2A shows example hologram layouts for windowing function exploration, according to some embodiments.

FIG. 2A shows hologram layouts for windowing function exploration, according to some embodiments. In this example, a static gallery of holograms is generated for a set of parameters, using a static layout around the user. For example, a 1D gallery that visualizes the window center changes or a collection of transfer function presets can be laid out on a spiral around the user. The user can visualize both the parameter changes and obtain different view orientation simply by looking around. FIG. 2C showcases a pre-computed spherical panorama that can be explored with a VR viewer, including viewers on a cellphone or tablet that leverage gyroscopic tracking.

Figure 2B:
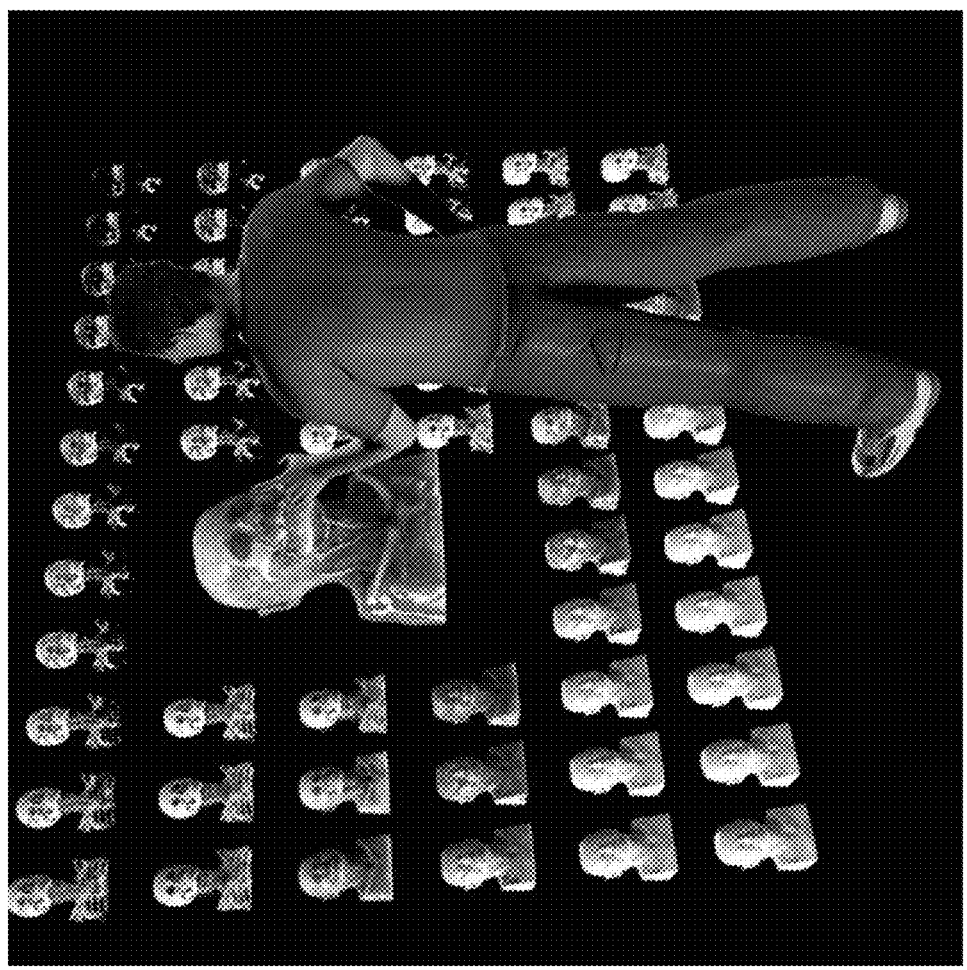
FIG. 2B shows an example planar layout with clustering, according to some embodiments of the present invention.
Figure 2C:
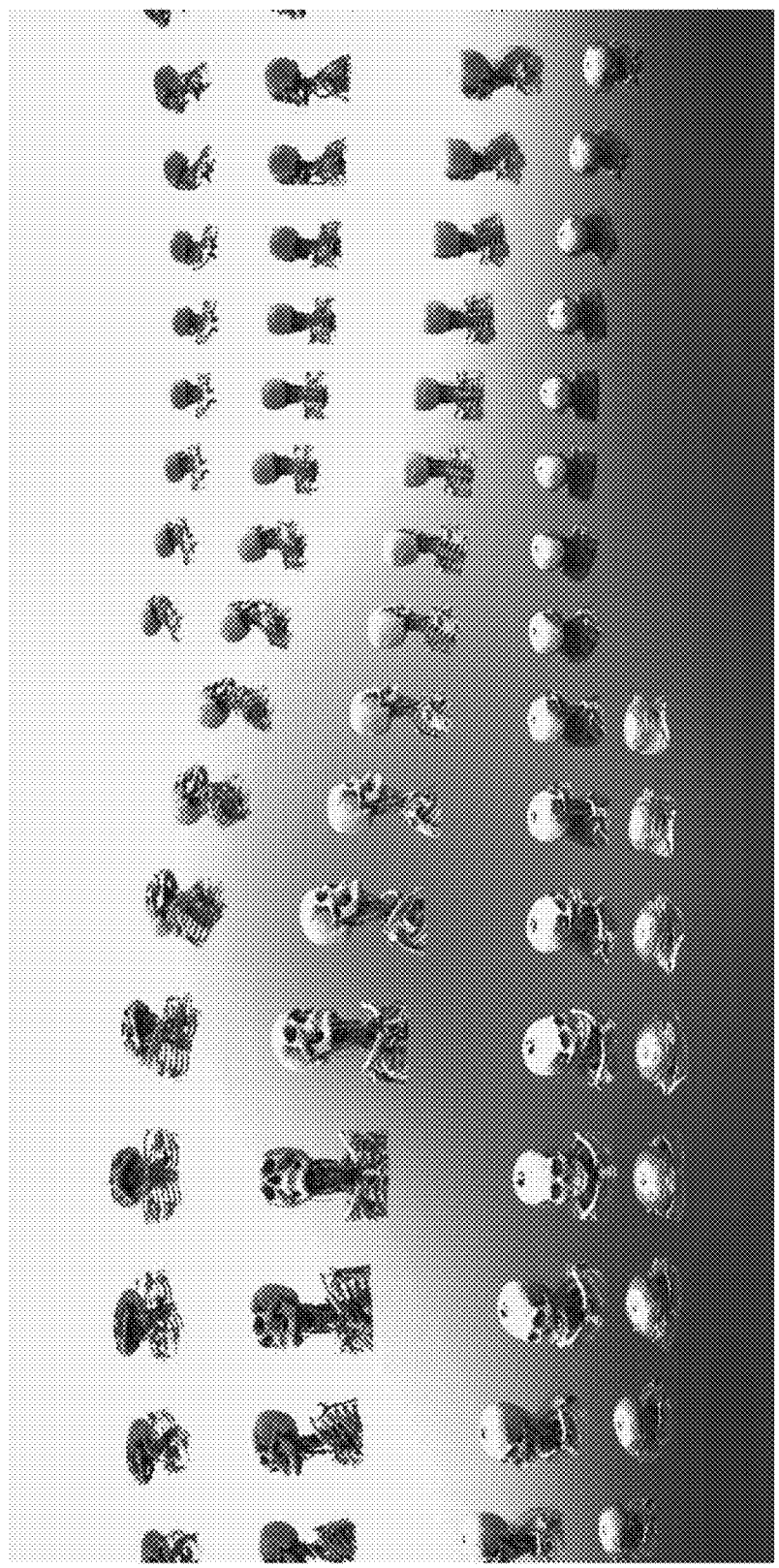
FIG. 2C shows an example pre-computed spherical panorama that can be explored with a VR viewer, including viewers on a cellphone or tablet that leverage gyroscopic tracking.

FIG. 2B shows a planar layout with clustering, according to some embodiments of the present invention. In this example, regular grids of holograms are used to explore multiple parameters at the same time (e.g., window width and window center in a 2D planar layout). The layout could also be wrapped into a cylinder around the user, or any other immersive layout can be used. Setting the window width and center is not entirely intuitive, but with this visualization, the user gains a better understanding of the effect of the parameters, can oversee a larger space of parameters at one glance and navigate the parameter space by moving around in physical space. The same principle to the exploration of parameters can be applied to different parameters. Users can select parameters they are interested in and perform an optimization of the multidimensional transfer function by spatially navigating, though practically not for more than 3 parameters at a time. However, users can explore a different subset of up to 3 parameters per step and explore higher-dimensional functions intuitively.

Figure 3:
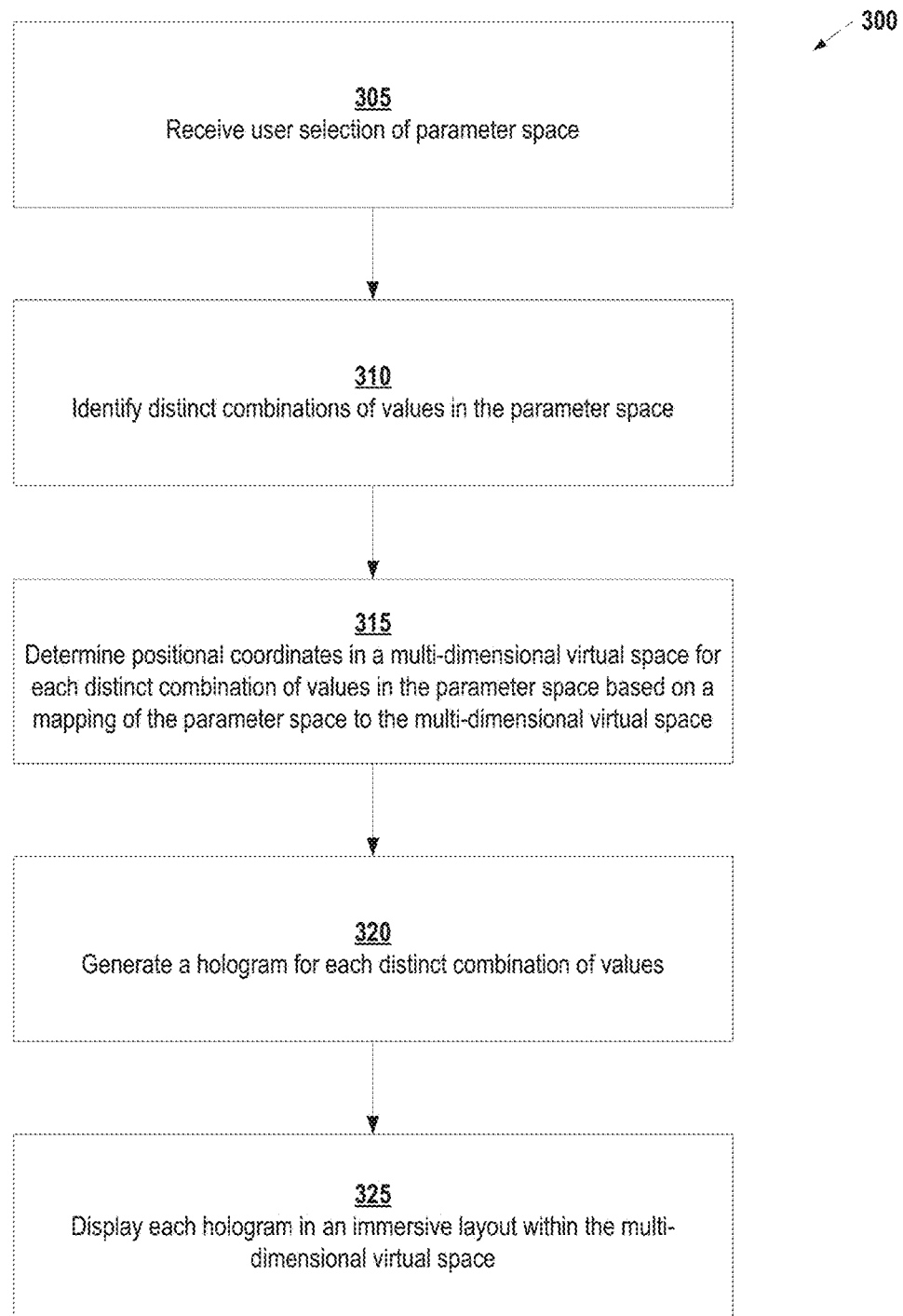
FIG. 3 illustrates a computer-implemented method for exploration of medical visualization parameters in virtual spaces, according to some embodiments.

FIG. 3 illustrates a computer-implemented method 300 for exploration of medical visualization parameters in virtual spaces, according to some embodiments. This example shows how the mapping between the parameter space and the virtual space can be generated. Starting at step 305, a user provides a selection of a parameter space related to image rendering. This parameter space includes all possible combinations of values for a plurality of image rending system parameters. For example, a user may indicate via a graphical user interface (GUI) that he or she wishes to explore the space of parameters related to windowing or a particular transfer function.

At step 310, the visualization system implementing the method identifies a plurality of distinct combination of values in the parameter space. In some embodiments, these combinations include all permutations of the parameters in the space; while in other embodiments a subset of all the permutations is selected based on factors such as user preference or capability between individual parameters. Once the combinations are determined, at step 315 the visualization system determines positional coordinates in a multi-dimensional virtual space for each distinct combination of values in the parameter space based on a mapping of the parameter space to the multi-dimensional virtual space. The multi-dimensional virtual space is the space that immersive layouts that may be generated in.

The action involved at step 315 effectively amounts to assigning each combination of parameters to a particular set of positional parameters in the virtual space. For example, based on the number of combinations, the virtual space may be divided accordingly and each combination may be assigned coordinates that produce a desired layout (e.g., row and column coordinates). Alternatively, coordinates in the virtual space may be assigned to arrange the combinations in a manner that highlights particular combinations of parameters. For example, a set of commonly used combinations of parameters may be assigned coordinates in the center of the virtual space, while less frequently used combinations can be assigned coordinates away from the center.

Continuing with reference to FIG. 3, at step 320, a hologram is generated for each distinct combination of values. More specifically, the visualization system renders a medical image or other medical data with each combination of values individually to generate a plurality of holograms. Next, at step 325 each hologram is displayed in an immersive layout within the multi-dimensional virtual space. This immersive layout is centered on a location corresponding to a user. Each hologram is displayed at the positional coordinates corresponding to the distinct combination of values used to generate the hologram. In one embodiment, the immersive layout comprises a spherical panorama which displays the holograms in a cylinder grid around a location corresponding to a user. The user interaction system may determine an orientation of the user within this immersive layout, and use this information to update the cylinder grid. For example, in one embodiment the cylinder grid is continually updated as the orientation rotates within the immersive layout and the holograms displayed at each rotational point do not repeat as the orientation of the user rotates through a complete revolution (i.e., an Infinite Canvas). In other embodiments, the immersive layout comprises a planar layout which displays the holograms in a two-dimensional grid in front of a location corresponding to a user. The holograms displayed in the planar layout may be updated, for example, based on a user swipe motion within the immersive layout.

Figure 4:
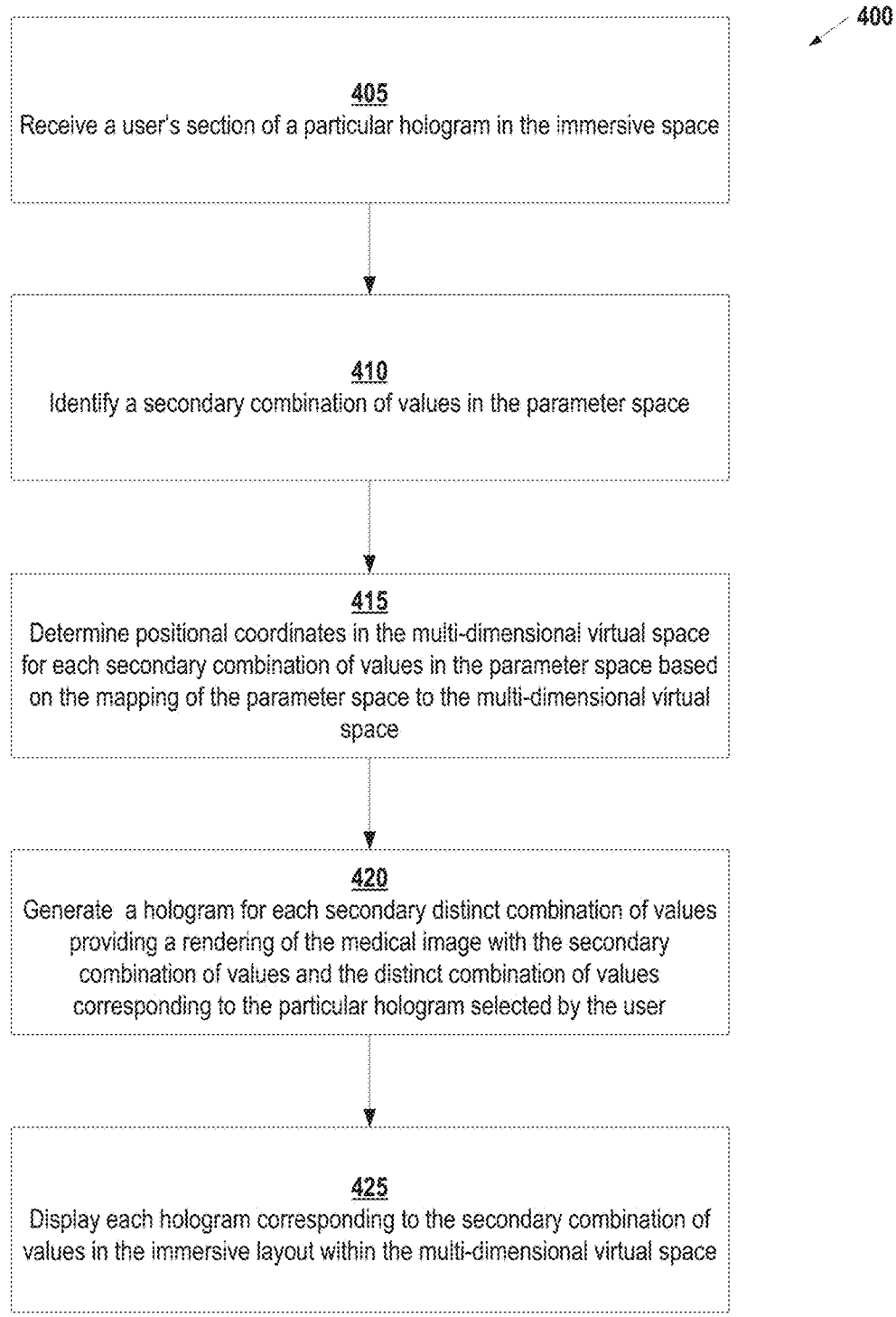
FIG. 4 shows an example method for extending the example shown in FIG. 3 to produce secondary layouts.

FIG. 4 shows an example method 400 for extending the example shown in FIG. 3 to produce secondary layouts. Starting at step 405, the system receives a user selection of a particular hologram in the immersive layout. For example, a user may use a grab motion on the hologram or hover the user's hand over the hologram for an extended period. At step 410, the system identifies a plurality of secondary combination of values in the parameter space. Each secondary combination of values excludes the distinct combination of values corresponding to the particular hologram selected by the user. Next, at step 415, the system determines positional coordinates in the multi-dimensional virtual space for each secondary combination of values in the parameter space based on the mapping of the parameter space to the multi-dimensional virtual space. At step 420, the system generates a hologram for each secondary distinct combination of values providing a rendering of the medical image with the secondary combination of values and the distinct combination of values corresponding to the particular hologram selected by the user. Then, at step 425, the system displays each hologram corresponding to the secondary combination of values in the immersive layout within the multi-dimensional virtual space.

Figure 5:
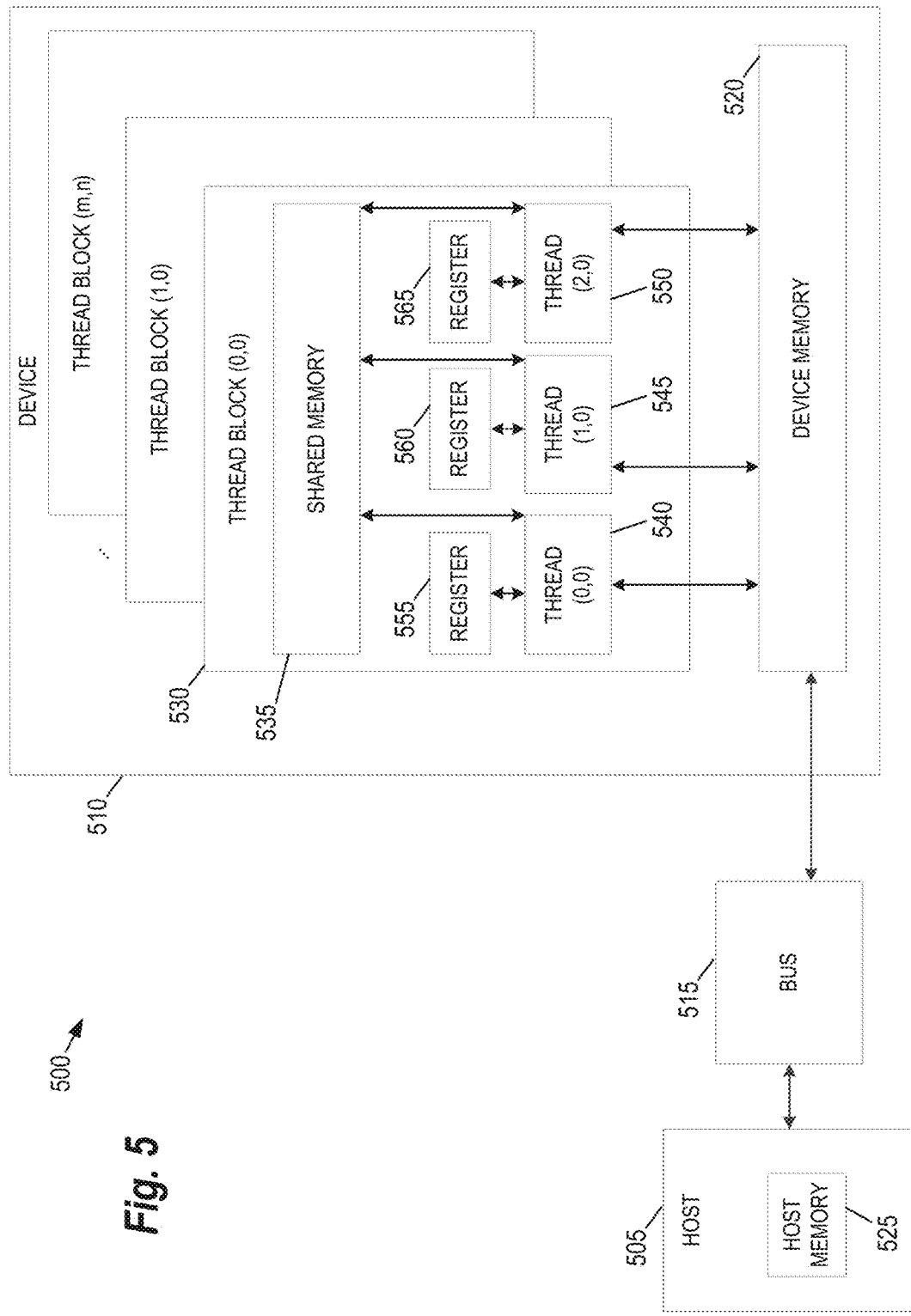
FIG. 5 provides an example of a parallel processing memory architecture that may be utilized by to perform computations related to rendering of the holograms or presenting the immersive layouts, according to some embodiments of the present invention.

FIG. 5 provides an example of a parallel processing memory architecture 500 that may be utilized by to perform computations related to rendering of the holograms or presenting the immersive layouts, according to some embodiments of the present invention. Such architectures are useful because of their extensive computational power and ability to solve large-scale optimization problems. This architecture 500 may be used in embodiments of the present invention where NVIDIA™ CUDA (or a similar parallel computing platform) is used. The architecture includes a host computing unit ("host") 505 and a GPU device ("device") 510 connected via a bus 515 (e.g., a PCIe bus). The host 505 includes the central processing unit, or "CPU" (not shown in FIG. 5) and host memory 525 accessible to the CPU. The device 510 includes the graphics processing unit (GPU) and its associated memory 520, referred to herein as device memory. The device memory 520 may include various types of memory, each optimized for different memory usages. For example, in some embodiments, the device memory includes global memory, constant memory, and texture memory.

Parallel portions of the applications described herein may be executed on the architecture 500 as "device kernels" or simply "kernels." A kernel comprises parameterized code configured to perform a particular function. The parallel computing platform is configured to execute these kernels in an optimal manner across the architecture 500 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by grid of thread blocks (described in greater detail below). Using concurrent kernel execution, streams, and synchronization with lightweight events, the architecture 500 of FIG. 5 (or similar architectures) may be used to parallelize the optimization function such that various operations performed with solving the system are done in parallel. For example, in some embodiments, multiple combinations of parameters can be processed in parallel to allow multiple holograms to be rendered simultaneously.

The device 510 includes one or more thread blocks 530 which represent the computation unit of the device 510. The term thread block refers to a group of threads that can cooperate via shared memory and synchronize their execution to coordinate memory accesses. For example, in FIG. 5, threads 540, 545 and 550 operate in thread block 530 and access shared memory 535. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 5, the thread blocks 530 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, combinations of parameters or the virtual space may be automatically partitioned over thread blocks automatically by the parallel computing platform software; while, in other embodiments, a user may programmatically specify the partitioning.

Continuing with reference to FIG. 5, registers 555, 560, and 565 represent the fast memory available to thread block 530. Each register is only accessible by a single thread. Thus, for example, register 555 may only be accessed by thread 540. Conversely, shared memory is allocated per thread block, so all threads in the block have access to the same shared memory. Thus, shared memory 535 is designed to be accessed, in parallel, by each thread 540, 545, and 550 in thread block 530. Threads can access data in shared memory 535 loaded from device memory 520 by other threads within the same thread block (e.g., thread block 530). The device memory 520 is accessed by all blocks of the grid and may be implemented using, for example, Dynamic Random-Access Memory (DRAM).

Each thread can have one or more levels of memory access. For example, in the architecture 500 of FIG. 5, each thread may have three levels of memory access. First, each thread 540, 545, 550, can read and write to its corresponding registers 555, 560, and 565. Registers provide the fastest memory access to threads because there are no synchronization issues and the register is generally located close to a multiprocessor executing the thread. Second, each thread 540, 545, 550 in thread block 530, may read and write data to the shared memory 535 corresponding to that block 530. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 510 to read and/or write to the device memory. Device memory requires the longest time to access because access must be synchronized across the thread blocks operating on the device. Thus, in some embodiments, the calculation of each hologram is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 5, standard computing platforms (e.g., servers, desktop computer, smartphones, tablets, etc.) may be specially configured to perform the techniques discussed herein. In some embodiments, the holograms and other images used with the techniques described herein are generated on a server and streamed to a user display device. In other embodiments, visualizations may be generated directly on an AR device (e.g., using Microsoft HoloLens™ as a self-contained visualization platform).

The embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112 (f) unless the element is expressly recited using the phrase "means for."

We claim:

1. A computer-implemented method for exploration of medical visualization parameters in virtual spaces, the method comprising:
   detecting a user location and a user orientation in a physical space;
   generating a display of an immersive layout centered at the user location and the user orientation;
   identifying a plurality of distinct combinations of rendering parameter values for rendering a medical image;
   assigning positional coordinates in the immersive layout to each distinct combination of parameter values;
   generating a hologram for each distinct combination of parameter values;
   displaying each hologram in the immersive layout at the positional coordinates assigned to the hologram's corresponding combination of parameter values; and
   updating the display based on a change to one or more of the user location and the user orientation in the physical space.

2. The method of claim 1, wherein each hologram is generated using a pre-rendered point cloud-based proxy located in the immersive layout.

3. The method of claim 1, wherein each hologram is generated using a mesh-based proxy located in the immersive layout.

4. The method of claim 1, wherein each hologram is generated using a light field located in the immersive layout.

5. The method of claim 1, wherein each hologram provides a photorealistic rendering of the medical image generated using one or more Monte Carlo ray tracing techniques.

6. A computer-implemented method for exploration of medical visualization parameters in virtual spaces, the method comprising:
   receiving a selection of a parameter space comprising all possible combinations of values for a plurality of image rendering system parameters;
   identifying a plurality of distinct combinations of values in the parameter space;
   determining positional coordinates in a multi-dimensional virtual space for each distinct combination of values in the parameter space based on a mapping of the parameter space to the multi-dimensional virtual space;

generating a hologram for each distinct combination of values providing a rendering of a medical image with the distinct combination of values;

displaying each hologram in an immersive layout within the multi-dimensional virtual space, wherein (i) the immersive layout is centered on a location corresponding to a user and (ii) each hologram is displayed at the positional coordinates corresponding to the distinct combination of values used to generate the hologram.

7. The method of claim 6, wherein the immersive layout comprises a spherical panorama which displays the holograms in a cylinder grid around a location corresponding to a user.

8. The method of claim 7, further comprising:
determining an orientation of the user within the immersive layout,
wherein the cylinder grid is updated upon changes to the orientation of the user.

9. The method of claim 8, wherein the cylinder grid is continually updated as the orientation rotates within the immersive layout and the holograms displayed at each rotational point do not repeat as the orientation of the user rotates through a complete revolution.

10. The method of claim 6, wherein the immersive layout comprises a planar layout which displays the holograms in a two-dimensional grid in front of a location corresponding to a user.

11. The method of claim 10, wherein the holograms displayed in the planar layout are updated based on a user swipe motion within the immersive layout.

12. The method of claim 6, further comprising:
receiving a user selection of a particular hologram in the immersive layout;
identifying a plurality of secondary combinations of values in the parameter space, wherein each secondary combination of values excludes the distinct combination of values corresponding to the particular hologram selected by the user;
determining positional coordinates in the multi-dimensional virtual space for each secondary combination of values in the parameter space based on the mapping of the parameter space to the multi-dimensional virtual space;
generating a hologram for each secondary distinct combination of values providing a rendering of the medical image with the secondary combination of values and the distinct combination of values corresponding to the particular hologram selected by the user; and
displaying each hologram corresponding to the secondary combination of values in the immersive layout within the multi-dimensional virtual space.

13. The method of claim 6, wherein the immersive layout is displayed on a physical object using one or more augmented reality display techniques.

14. A computer-implemented method for exploration of medical visualization parameters in virtual spaces, the method comprising:
receiving a selection of a parameter space comprising all possible combinations of values for a plurality of image rending system parameters;
identifying a plurality of distinct combinations of values in the parameter space;
assigning positional coordinates in an immersive layout to each distinct combination of parameter values;
generating a plurality of holograms corresponding to the plurality of distinct combinations of values, wherein each hologram is a rendering of a medical image with one of the distinct combinations of values;
creating clusters of holograms, wherein each cluster comprises a plurality of visually similar holograms from the plurality of holograms; and
displaying the clusters of holograms in the immersive layout within a multi-dimensional virtual space, wherein each hologram is displayed at the positional coordinates assigned to the hologram's corresponding combination of parameter values.

15. The method of claim 14, wherein each cluster of hologram is displayed in the immersive layout at a size corresponding to the number of holograms included in the cluster.

16. The method of claim 14, further comprising:
receiving a user selection of a cluster of holograms included in the clusters of holograms;
in response to the user selection, displaying each cluster included in the cluster of holograms in a secondary layout within the multi-dimensional virtual space.

17. The method of claim 16, wherein the secondary layout is a spherical shell layout centered on the location of the cluster of holograms within the immersive layout.

18. The method of claim 16, wherein the secondary layout is displayed in front of the cluster of holograms with reference to the user location.

19. The method of claim 14, wherein the clusters of holograms are created by:
calculating a perceptual hash for each of the plurality of holograms;
clustering the plurality of holograms according to their respective perceptual hashes.

* * * * *